United States Patent
Akgun et al.

(10) Patent No.: US 7,366,509 B2
(45) Date of Patent: Apr. 29, 2008

(54) METHOD AND SYSTEM FOR IDENTIFYING AN ACCESS POINT INTO A WIRELESS NETWORK

(75) Inventors: Ali Akgun, Chicago, IL (US); Ravideep Bhatia, Rolling Meadow, IL (US); Michael Borella, Naperville, IL (US)

(73) Assignee: UTStarcom, Inc., Alameda, CA (US)

( * ) Notice: Subject to any disclaimer, the term of this patent is extended or adjusted under 35 U.S.C. 154(b) by 304 days.

(21) Appl. No.: 10/803,417

(22) Filed: Mar. 18, 2004

(65) Prior Publication Data

US 2006/0073840 A1   Apr. 6, 2006

(51) Int. Cl.
*H04Q 7/20* (2006.01)
*H04Q 7/32* (2006.01)

(52) U.S. Cl. .............. 455/435.1; 455/435.2; 455/435.3; 455/414.1; 455/414.2; 455/414.3; 455/426.1; 455/422.1; 370/338; 370/328

(58) Field of Classification Search .......... 455/435.1, 455/435.2, 434, 422.1, 426.1, 426.2, 403, 455/412.1, 412.2, 466, 414.1, 414.2, 414.3, 455/500, 517, 550.1, 445, 456.1–457, 432.1, 455/432.2, 432.3, 435.3; 370/338, 328; 709/246

See application file for complete search history.

(56) References Cited

U.S. PATENT DOCUMENTS

| | | | |
|---|---|---|---|
| 5,958,018 A * | 9/1999 | Eng et al. ............... | 709/246 |
| 2003/0051140 A1* | 3/2003 | Buddhikot et al. ....... | 713/169 |
| 2004/0066759 A1* | 4/2004 | Molteni et al. .......... | 370/329 |
| 2005/0018686 A1* | 1/2005 | Igarashi et al. ......... | 370/395.2 |
| 2005/0254474 A1* | 11/2005 | Iyer et al. ............. | 370/338 |

OTHER PUBLICATIONS

International Search Report for PCT/US05/08937 mailed Mar. 2, 2007.

* cited by examiner

*Primary Examiner*—Keith Ferguson (57) ABSTRACT

A method and system for a mobile station to identify to a wireless network agent, an access point into a wireless network. The mobile station obtains an indication of an access point into the wireless network and inserts the indication into a mobile registration message. The access point identifier identifies an access point into the wireless network. Then, the mobile station sends the mobile registration message to the wireless network agent via the access point identified by the access point identifier. The wireless network agent receives the mobile registration message and provides the access point identifier to an authentication, authorization, and accounting (AAA) server. The AAA server uses the access point identifier to provide location-based services to the mobile station.

50 Claims, 6 Drawing Sheets

METHOD AND SYSTEM FOR IDENTIFYING AN ACCESS POINT INTO A WIRELESS NETWORK

BACKGROUND

1. Field of Invention

This invention relates to wireless networks and more particularly to a method and system for a mobile station to identify to a wireless network agent, an access point into a wireless network. The wireless network agent may be a foreign agent or a home agent of the wireless network, for example, and the access point enables the mobile station to communicate over an air interface with an entity in the wireless network.

2. Description of Related Art

Mobile Internet protocol ("mobile IP") defines mechanisms to allow a mobile station to move between coverage areas of wireless networks without communications with the mobile station being disrupted.

A home network is one of the coverage areas of the wireless network. In the home network, the mobile station operates like a node on the wireless network. The mobile station has a home address that allows packets to be delivered directly to the mobile station. Also, the home network has a home agent. The mobile station registers with the home agent so that, among other functions, the home agent can keep track of whether the mobile station is in the coverage area of the home network.

A visited network is another coverage area of the wireless network. The visited network is a network other than the home network. If the mobile station moves within the coverage area of the visited network, then the mobile station registers with a foreign agent. Among other functions, the foreign agent keeps track of whether the mobile station is in the coverage area of the foreign network. The mobile station also registers with the home agent. By registering with the home agent, the home agent can direct to the visited network any packets having the home address of the mobile station. The mobile station obtains a temporary IP address in the visited network, through dynamic host configuration protocol (DHCP) or any other mechanism. The temporary IP address allows the mobile station to receive packets when attached to the visited network.

The carrier division multiple access (CDMA) architecture defines an exemplary configuration of the home network and the visited network. In the CDMA architecture, the home network and the visited network include a base station and a packet data serving node (PDSN). The base station produces a radiation pattern that defines a coverage area for the visited network and the PDSN provides a packet-based interface into an IP network.

When a traffic channel is assigned to the mobile station and a radio-packet (R-P) link is established between the base station and the PDSN, the mobile station can communicate with the entities in the CDMA architecture. The traffic channel carries packets between the mobile station and the base station and the R-P link carries packets between the base station and the PDSN.

Registration on the Wireless Network

The mobile station will engage in mobile IP registration after establishing the PPP session. The process by which the mobile station engages in mobile IP registration depends on whether the mobile station is in a visited network or in a home network.

(a) Mobile Registration in a Visited Network

If the mobile station is in a visited network, then the mobile station listens for agent advertisement messages from a foreign agent in the wireless network. The agent advertisement messages indicate to the mobile station that a foreign agent is available to serve the mobile station. When a mobile station receives an agent advertisement message, it sends a mobile station registration request to the foreign agent.

The foreign agent will receive the mobile registration request. Then, the foreign agent will send an access request to an authentication, authorization, and accounting (AAA) server. The access request may have a base station identifier (BSID). The BSID uniquely identifies the base station that serves the mobile station. The access request is a request by the foreign agent to authorize the mobile station to register with the foreign agent. The base station provides the BSID to the PDSN when the R-P link is established.

The AAA server will use the BSID of the base station to determine whether to authorize the mobile station to register with the foreign agent. If certain base stations identified by the BSID serve the mobile station, then the AAA server might not allow the mobile station to register with the foreign agent. If other base stations identified by the BSID serve the mobile station, then the AAA server might allow the mobile station to register with the foreign agent. The AAA server may also use the BSID to provide differentiated billing to the mobile station based on the particular base station that serves the mobile station. The wireless network may bill an account for the mobile station at one rate if the base station that serves the mobile station is part of one group of base stations, and bill the account for the mobile station at a second rate if the base station is part of another group of base stations.

The AAA server sends a reply to the access request, indicating whether the mobile station is authorized to register with the foreign agent. Then, the foreign agent may send the registration request to the home agent so that the home agent can determine whether the mobile station is authorized to register with the home agent. Like the foreign agent, the home agent may send an access request to the AAA. In turn, the home agent may receive an access reply to the access request. The access reply may indicate whether the mobile station is authorized to register with the home agent. In this regard, the home agent may provide to the foreign agent an indication of whether the mobile station is authorized to register with the home agent.

If the AAA server refuses to authorize the access requests, then the mobile station is not authorized to register with the foreign agent and/or the home agent. The mobile station cannot communicate over the wireless network. If the AAA server authorizes the access requests, then the mobile station is authorized to register with the foreign agent and the home agent. From this point forward, the home agent may tunnel to the foreign agent packets destined to the mobile station. The foreign agent then delivers them to the mobile station. When the mobile station is originating packets, the mobile station can send them to the foreign agent which then tunnels them to the home agent.

(b) Mobile Registration on a Home Network

When the mobile station is in the home network, the mobile station sends the mobile registration message to a home agent. The mobile station might not have to send a mobile registration message to a foreign agent because the mobile station is already in the home network. The mobile station inserts the address of the home agent into the mobile registration message and sends the mobile registration message to the home agent. The mobile station typically is programmed with the address of the home agent.

The home agent will receive the mobile registration request and send an access request to the AAA server. The access request may have a BSID. The AAA server will use the BSID to determine whether to authorize the mobile station to register with the home agent and/or to provide differentiated billing to the wireless terminal. The AAA server then sends a reply to access request, indicating whether the mobile station is authorized to register with the home agent. In turn, the home agent may provide to the mobile station an indication of whether mobile station is authorized to register with the home agent.

802.11 Protocol Networks In a CDMA network, the AAA server uses the BSID to authorize the mobile station to register with a wireless network agent and provide differentiated billing to the mobile station, for example. In the Institute of Electronics and Electrical Engineers (IEEE) 802.11 et al. protocol, another well known wireless network protocol, the mobile station accesses a wireless network through an access point. The access point is analogous to the base station, but the access point typically serves a geographic area smaller than that served by the base station of the CDMA network. Also, the access point typically provides higher bandwidth communication to the mobile station compared to the base station. Mobile IP call setup in an 802.11 protocol network also involves sending a mobile IP registration request to a wireless network agent and the AAA server authenticating the mobile station to register with the wireless network agent. But because the 802.11 protocol network does not define any mechanism for identifying to the wireless network agent an indication of the access point into the wireless network, the 802.11 protocol network is not arranged to provide similar services available to mobile stations operating in the CDMA architecture.

SUMMARY

In accordance with an exemplary embodiment, a mobile station inserts an access point identifier into a mobile registration message. The access point identifier may identify an access point into the wireless network. The mobile station then sends the mobile registration message to a wireless network agent, via the access point. The wireless network agent may receive this mobile registration message, extract the access point identifier from the mobile registration message, and send the access point identifier to an AAA server. The AAA server may then use the access point identifier to provide a location-based service to the mobile station.

The location-based service might be for the AAA server to make a determination of whether to authorize the mobile station to register with the wireless network agent based on the access point identifier. Additionally or alternatively, the AAA server may (based on the access point identifier) refuse the registration by the mobile station, send to the mobile station an indication of an alternative access point, and the mobile station may establish communication with the alternative access point. Still additionally or alternatively, the AAA server may establish a billing rate for the mobile station based on the access point identifier.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
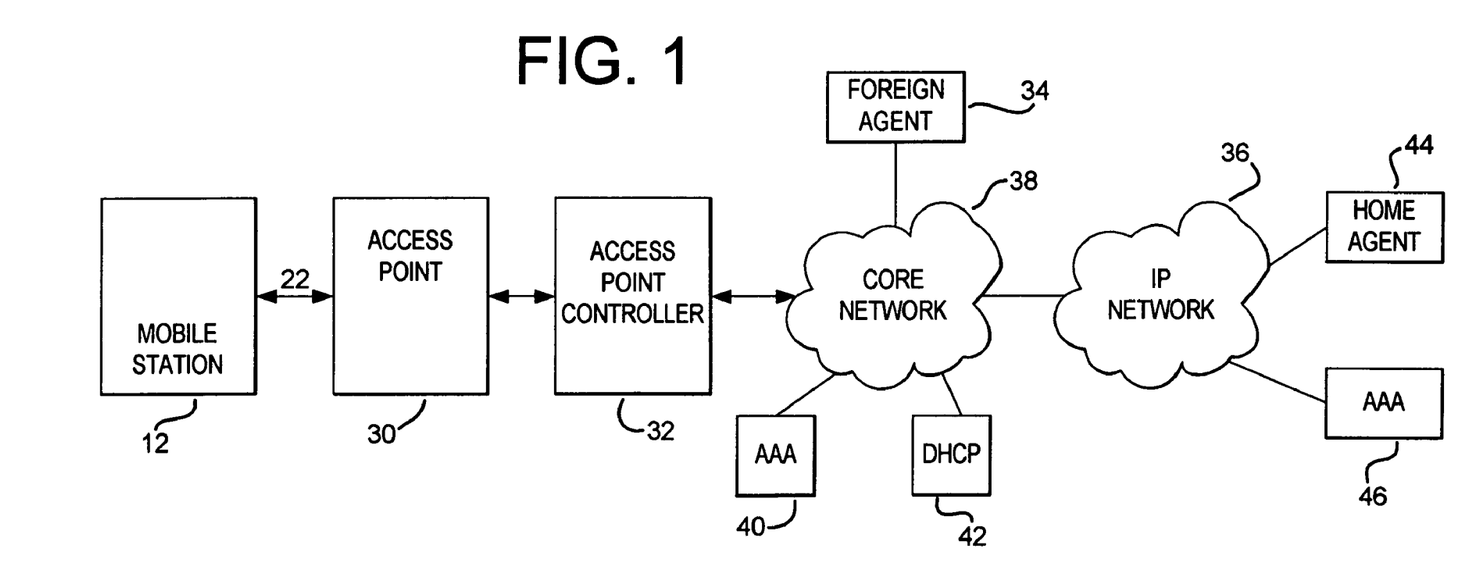
FIG. 1 is a block diagram of a wireless network.

FIG. 1 is a block diagram of a wireless network architecture in which an exemplary embodiment of the present invention may be employed. Those skilled in the art will appreciate that many of the elements described in the exemplary embodiment are functional entities that may be implemented as discrete components or in conjunction with other components, in any suitable combination or location. Still further, various functions described herein as being performed by one or more entities may be carried out by a processor programmed to execute an appropriate set of computer instructions stored in memory. Provided with the present disclosure, those skilled in the art can readily prepare the appropriate set of computer instructions to perform the various functions.

As illustrated in FIG. 1, the wireless network may be a wireless local area network (WLAN) (also known as a "WiFi" network) for providing wireless communication services to a mobile station. The IEEE 802.11 et al. specification defines the elements of the WLAN network. Exemplary embodiments may be implemented in the WLAN network, for example, but such implementations are not limited to the WLAN network.

The wireless network is shown to include a mobile station 12 that communicates, via an air interface 22, with an access point 30. The mobile station 12 might be a cellular telephone or a computer with wireless modem, for example. The access point 30 facilitates communication by the mobile station 12 over the air interface 22. The mobile station 12 communicates with the access point 30 using the 802.11 protocol. The access point 30 may include an antenna that produces a radiation pattern defining a cell and/or sector in which a plurality of mobile stations operate. Among other functions, the access point 30 may broadcast an access point identifier. The access point identifier may take the form of a service set identifier (SSID) or extended SSID. Typically, the SSID identifies an access point into the wireless network, and the extended SSID identifies a number of access points into the wireless network.

The mobile station 12 listens for a broadcast of the access point identifier from one or more access points. For example, the mobile station 12 may monitor one or more predetermined frequencies for broadcasts of one or more access point identifiers by the access points. The mobile station 12 may use the one or more access point identifiers received in the broadcasts to identify one or more access points available to the mobile station 12.

A plurality of access points 30 may be coupled to an access point controller 32. The access point controller 32 aggregates packets from the plurality of access points. In turn, the access point controller 32 is coupled to a core network 38. The core network 38 has a server 34, a AAA server 40, and a DHCP server 42. The server 34 in the core network 38 may run computer instructions stored in memory that defines a wireless network agent. The server 34 might be a PDSN and the wireless network agent might be a foreign agent. The DHCP server 42 in the core network 38 functions to assigns an IP address to the mobile station 12 in the visited network. Additionally, the AAA server 40 performs authentication, authorization, and accounting service for the mobile station 12.

The foreign agent 34 typically exchanges signals with the AAA server 40 to authenticate the mobile station 12 to register with the foreign agent 34. The signals may confirm to industry standard remote authentication dial-in user service (RADIUS) protocol or the industry standard DIAMETER protocol.

The core network 38 may be coupled to an IP network 36. The IP network 36 may have a server 44 which executes computer instructions stored in memory to define another wireless network agent. The wireless network agent is a home agent 44. The home agent 44 exchanges signals with a AAA server 46 to authenticate the mobile station 12 to register with the home agent 44.

The wireless network architecture of FIG. 1 may take a variety of other forms. For instance, the access point 30 might be directly coupled to the core network 38 rather than being coupled via an access point controller 32. Additionally or alternatively, the wireless network architecture might not have a foreign agent 34, and in this regard, the mobile station 12 might register directly with the home agent 44 and not with the foreign agent 34. This arrangement is commonly referred to as a co-located architecture. Other arrangements are also possible.

Figure 2:
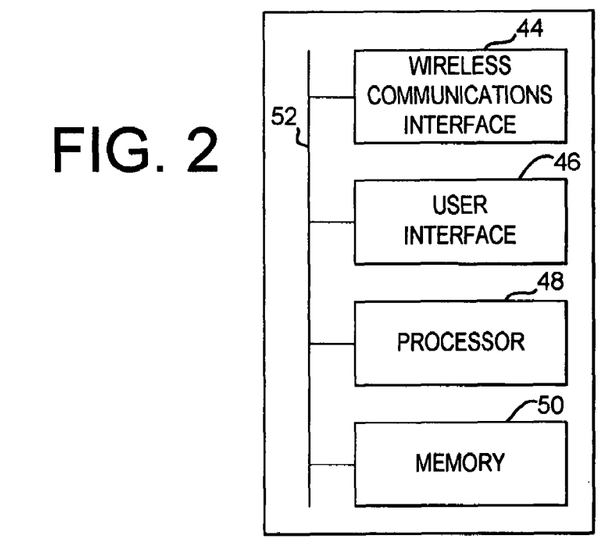
FIG. 2 is a block diagram of a mobile station that operates in the wireless network of FIG. 1.

FIG. 2 is a block diagram showing functional components of the mobile station 12. As illustrated, the mobile station 12 includes a wireless communication interface 44, a user interface 46, a processor 48, and memory 50, coupled to a bus 52. The bus 52 communicatively couples the functional components of the mobile station 12.

In the exemplary embodiment, the wireless communication interface 44 enables the mobile station 12 to transmit and receive signals over the air interface 22. The wireless communication interface 44 typically includes some type of transceiver circuitry for transmitting and receiving the signals over the air interface 22. An example of the transceiver circuitry might be the radioOne™ chipset manufactured by Qualcomm™ of San Diego, Calif., but other arrangements are also possible.

The user interface 46 operates in conjunction with the wireless communication interface 44 so that a user can send and receive signals over the air interface 22. The user interface 46 may include an input mechanism and an output mechanism. The form of the input mechanism and output mechanism may depend on the type of mobile station 12. If the mobile station is a computer with wireless modem, then the input mechanism might be a keyboard for converting user-input into data signals and the output mechanism might be a video display for displaying data defined by received data signals. On the other hand, if the mobile station 12 is a cellular telephone, then the input mechanism might be a microphone for picking up audio sounds and the output mechanism might be a speaker for playing back audio sounds. Other arrangements are also possible.

The processor 48 executes computer instructions stored in the memory 50 to operate the wireless communication interface 44 and the user interface 46. For instance, the processor 48 may execute computer instructions that cause the wireless communication interface 44 to transmit and receive signals over the air interface 22 and the user interface 46 to receive input from the input mechanism and present information to the output mechanism. The memory 50 may store computer instructions executable by the processor 40 to perform other functions as well.

Figure 3:
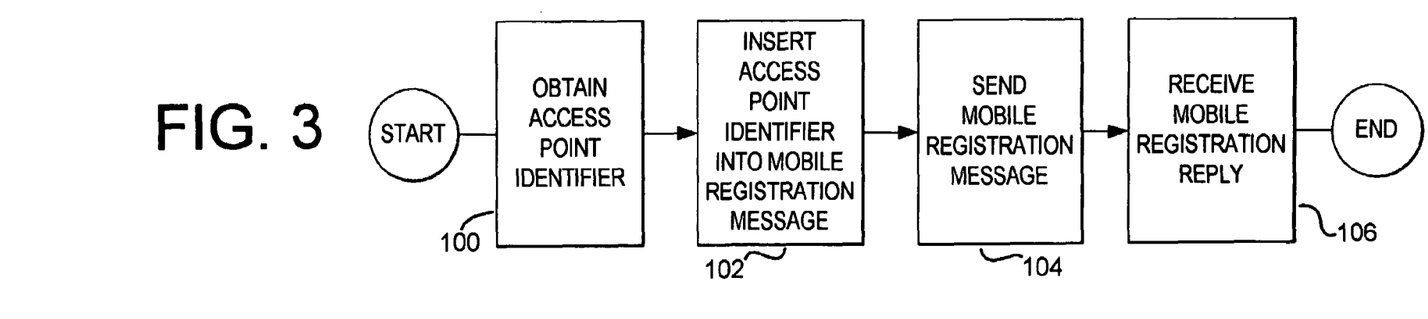
FIG. 3 is a flow chart that generally depicts functions performed by the mobile station of FIG. 2.

FIG. 3 is a flow chart that generally illustrates functions performed by the mobile station 12 to identify an access point 30 into a wireless network. The mobile station 12 provides the identification to a wireless network agent, for example, the foreign agent and/or home agent. In turn, the wireless network agent may provide the identification to the AAA server 40. The AAA server 40 will then be able to provide location-based services to the mobile station 12.

At step 100, the mobile station 12 obtains an access point identifier. The access point identifier may be received in a broadcast by the access point 30. Alternatively, the mobile station 12 may retrieve an access point identifier from the memory 50. For instance, the mobile station 12 may be programmed with an access point identifier during an initialization or configuration of the mobile station 12. At step 102, the mobile station 12 inserts the access point identifier into a mobile registration message. The mobile registration message is a request by the mobile station 12 to access the wireless network via the access point 30. Then, at step 104, the mobile station 12 sends the mobile registration message to a wireless network agent via the access point 30. At step 106, the mobile station 12 receives a mobile registration reply. The mobile registration reply may indicate whether the mobile registration request was granted.

The access point identifier identifies the particular access point 30 via which the mobile station 12 sent its mobile registration message, and thus a general location of the mobile station 12 in the wireless network. As a result, by inserting the access point identifier into the mobile registration message, the mobile station 12 is able relay to the wireless network agent its general location. The wireless network agent may receive the access point identifier and send the access point identifier to the AAA server 40. For instance, the wireless network agent may send the access point identifier in an access request or an accounting record, using the well-known RADIUS or DIAMETER protocol. The access request is an authorization request by the wireless network agent and the accounting record typically contains accounting information, such as a number of packets sent to the wireless terminal and an IP address of the mobile station. The AAA server 40 may receive this access point identifier and use the access point identifier to provide various location-based services to the mobile station 12.

In one arrangement, the AAA server 40 may use the access point identifier to authorize the mobile station 12 to register with the wireless network agent. For example, the mobile station 12 may be allowed to register with the wireless network agent if the access point identifier in the mobile registration message identifies a particular access point into the wireless network. On the other hand, if the access point identifier does not identify a particular access point into the wireless network, then the mobile station 12 might not be allowed to register with the wireless network agent.

In another arrangement, the AAA server 40 may use the access point identifier to provide differentiated billing to the mobile station 12. The access point identified by the access point identifier indicates the access point by which the mobile station accesses the wireless network. The AAA server 40 can keep track of the access point by which the mobile station accesses the wireless network and charge the mobile station at a rate in accordance with the access point.

In yet another arrangement, the AAA server 40 may use the access point identifier to direct the mobile station 12 to certain access points 30 in the wireless network. The access point identifier identifies the access point by which the mobile station is accessing the wireless network. In some cases, the AAA server 40 may determine that the mobile station should access the wireless network though an alternative access point. By accessing the wireless network through the alternative access point, network load is spread out more evenly over all the access points 30 into the wireless network. In this regard, the AAA server 40 may use the access point identifier in the mobile registration message to identify an alternative access point into the access point. The AAA server 40 may cause the wireless network agent to insert into the mobile registration reply an indication of an alternative access point through which the mobile station 12 should send a mobile registration request.

Figure 4:
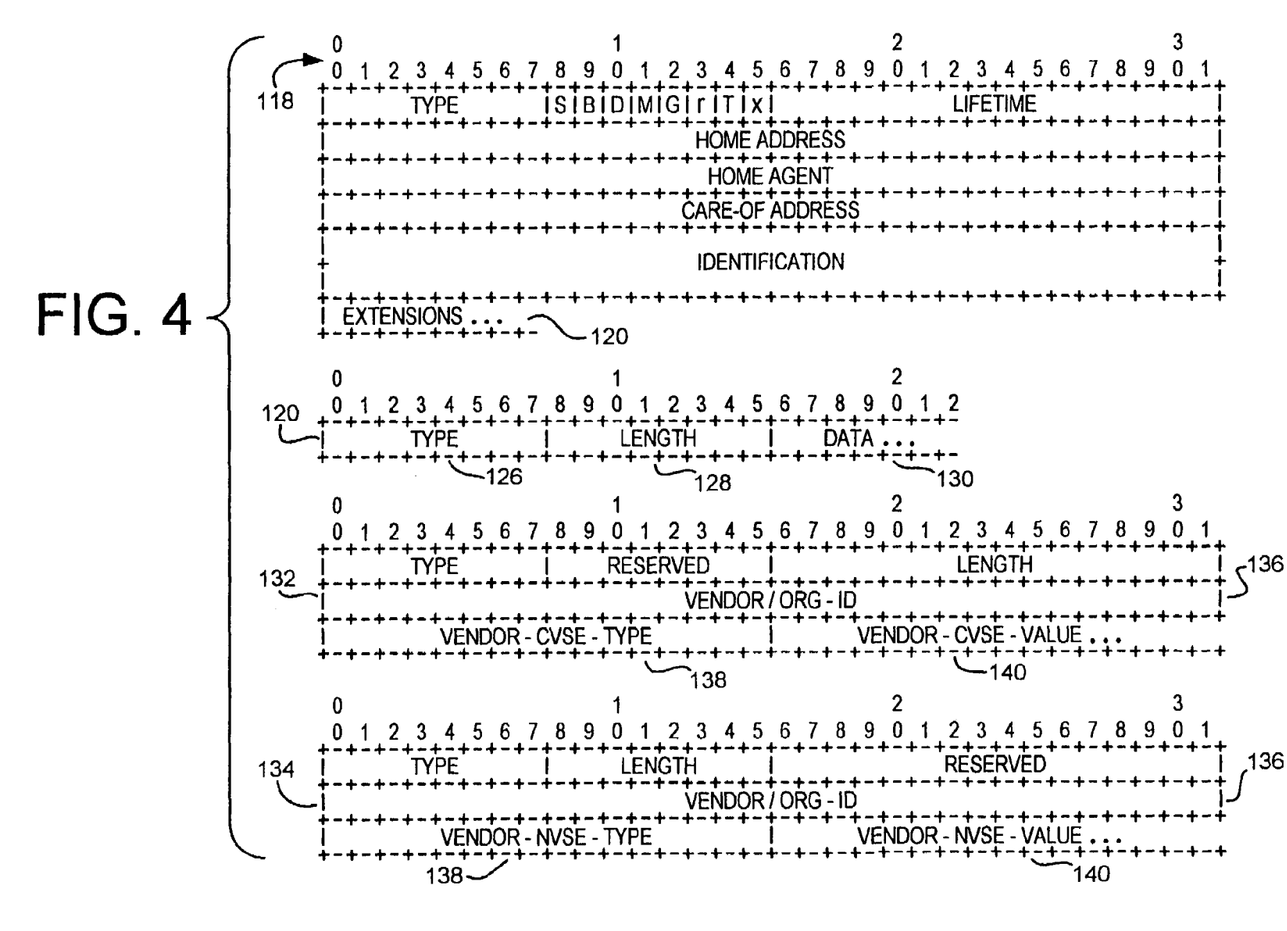
FIG. 4 is an illustration of a mobile IP registration request described in the flow chart of FIG. 3.

FIG. 4 illustrates an exemplary form of the mobile IP registration request 118. The mobile IP registration request 118 typically has an extension field 120 for inserting user-specific information. The mobile station may insert the access point identifier into the extension field 120 of the mobile IP registration request.

For example, the extension field 120 is arranged to have a type field 126, a length field 128, and a data field 130. For an access point identifier, the type field 126 may have a code indicative of an access point identifier inserted into the extension field, the length field 128 may identify a character length of the access point identifier, and the data field 130 may identify the access point identifier. The access point identifier may be a character string that identifies an access point 30, but other arrangements are also possible.

Alternatively, the extension field 120 may support a critical vendor specific extension (CVSE) 132 or a normal vendor specific extension (NVSE) 134. The CVSE 132 and NVSE 134 are alternative formats that the extension field 120 could take. The CVSE 132 and the NVSE 134 allow vendors to describe their own extensions. The CVSE 132 and NVSE 134 may have a vendor identification 136 that uniquely identifies the vendor. The vendor identification is followed by a type field 138 which identifies to the vendor that an access point identifier is in a value field 140.

The difference between the CVSE and NVSE is the manner in which the extension field is treated by a recipient. If a recipient of this packet does not recognize a CVSE extension, then the packet is discarded. On the other hand, if the recipient of the packet does not recognize a NVSE, then the extension field is skipped, but the packet is not discarded.

Figure 5:
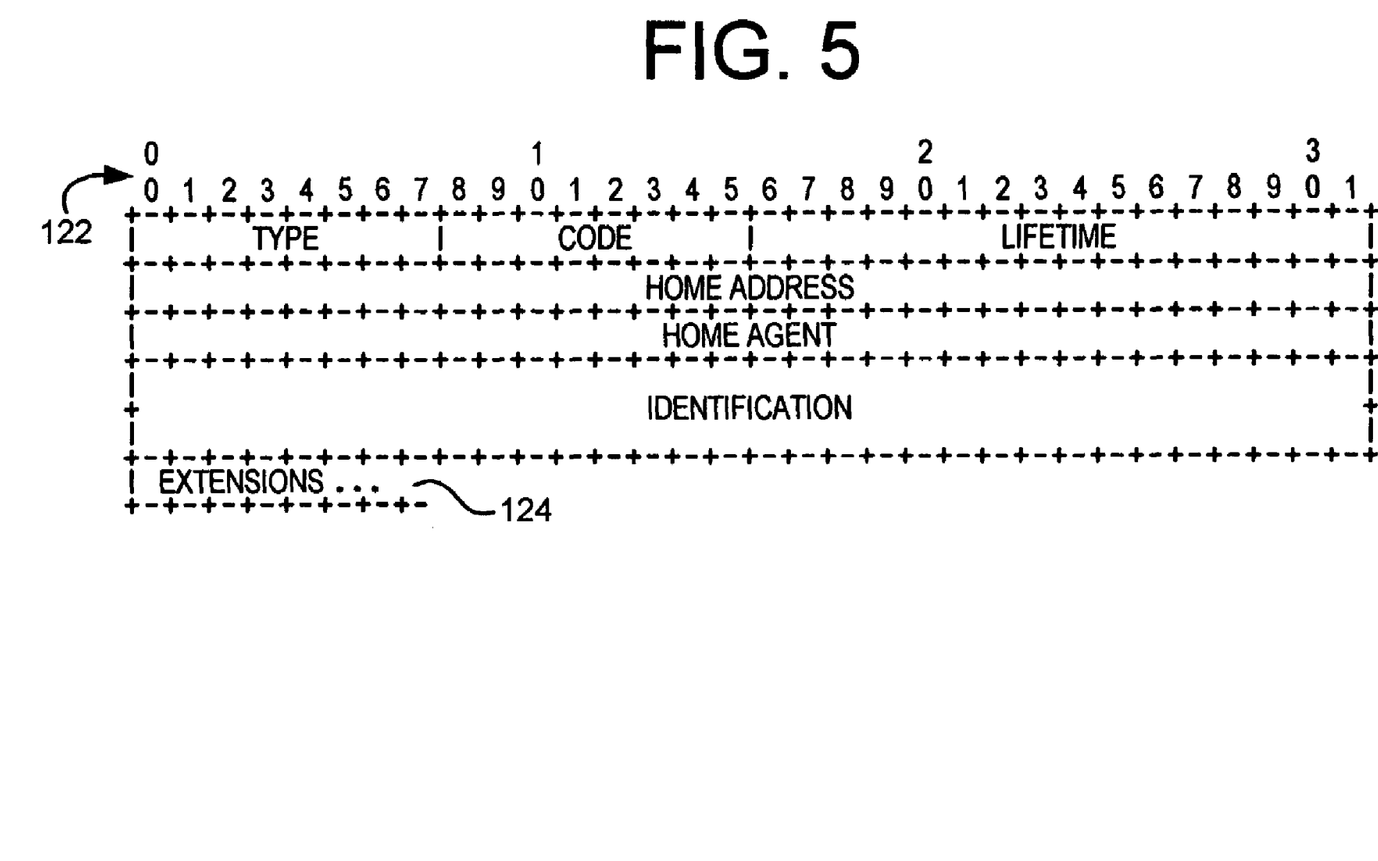
FIG. 5 is an illustration of a mobile IP registration reply described in the flow chart of FIG. 3.

FIG. 5 illustrates an exemplary form of the mobile IP registration reply 122. The registration reply 122 may indicate whether the mobile station registration is granted, or alternatively identify an alternative access point into the wireless network. Like the registration request, the registration reply may have an extension field 124. The wireless network agent may insert an access point identifier into the extension field 124 of the registration reply to identify the alternative access point into the wireless network. The extension field 124 may have a type, length, value format, a CVSE format, or a NVSE format, for example. The mobile station 12 may receive this mobile IP registration reply and extract the access point identifier in the extension field to determine the alternative access point to which it should send the registration request.

Figure 6:
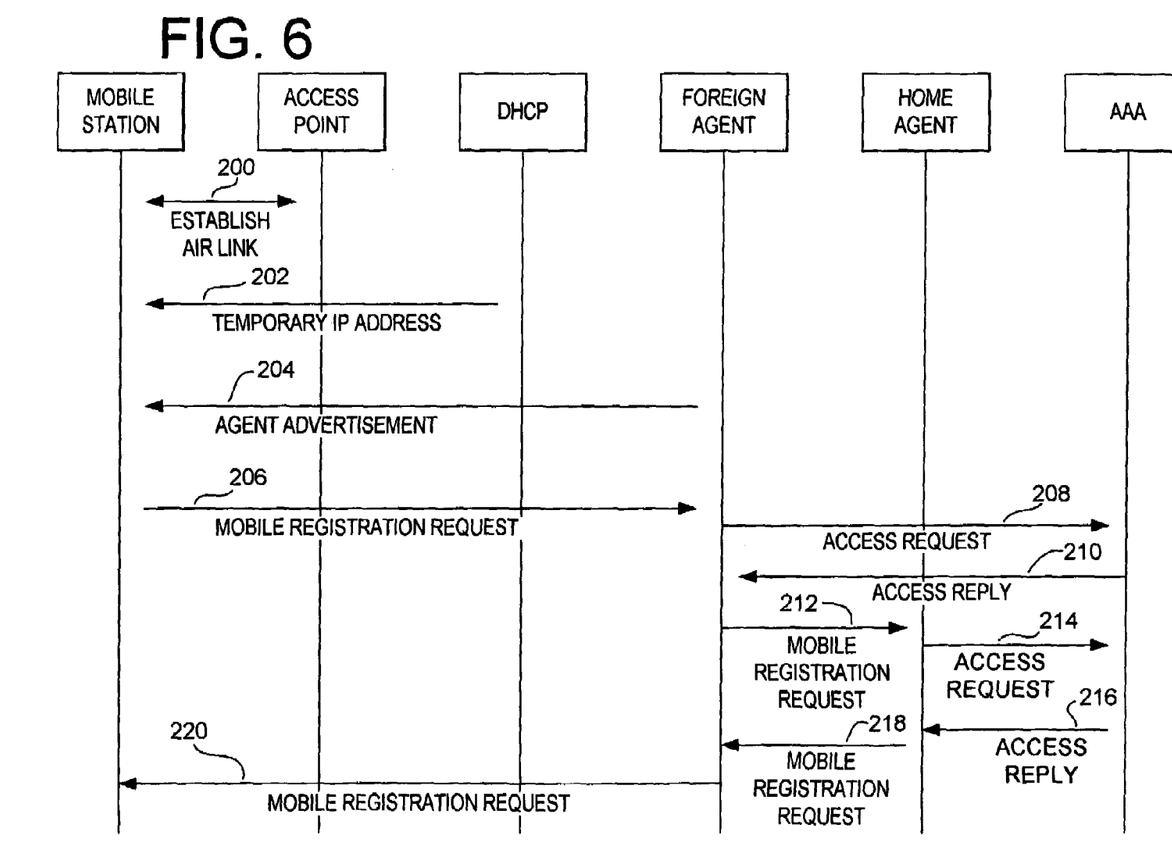
FIG. 6 is a call flow for mobile call setup in the wireless network of FIG. 1.

FIG. 6 is a call flow that depicts mobile IP call setup when the wireless network has a foreign agent and a home agent, in accordance with the exemplary embodiment of the present invention.

At step 200, the mobile station 12 establishes an air link with an access point 30 into the wireless network. The air link facilitates communication between the mobile station 12 and the access point 30 over the air interface 22. For example, the access point may broadcast an access point identifier, e.g., an SSID or extended SSID, to the mobile station 12 and the mobile station 12 may listen for the access point identifier in the broadcast. When the mobile station 12 receives the access point identifier, the mobile station 12 will send an access request. The access request is sent to the access point 30 identified by the access point identifier. Also, the access point 30 may assign a traffic channel to the mobile station 12. The traffic channel allows the mobile station 12 to exchange data traffic with the access point 30, over the air interface.

At step 202, the mobile station receives a temporary IP address from the DHCP server 42. The IP address of the mobile station 12 may be dynamically assigned. In this regard, the DHCP server may assign an IP address to the mobile station 12, and send the IP address to the mobile station 12 when the access point 30 grants the traffic channel to the mobile station 12.

After obtaining the traffic channel and the P address, the mobile station 12 engages in mobile P registration. At step 204, a foreign agent sends an agent advertisement to the mobile station 12. The agent advertisement indicates that the foreign agent is available to serve the mobile station 12. The mobile station 12 receives the agent advertisement, inserts into a mobile registration request, the access point identifier received in the broadcast by the access point 30, and at step 206, sends the mobile registration request to the foreign agent. The mobile station 12 sends the mobile registration request to the foreign agent via the access point 30 identified by the access point identifier. The mobile registration request is a request to register with the foreign agent.

The foreign agent receives the mobile IP registration request. The foreign agent extracts the access point identifier from the mobile IP registration request and inserts the access point identifier into an access request. Additionally, the foreign agent may store the access point identifier in memory to keep track of the access point which the mobile station 12 uses. At step 208, the foreign agent may send a message to the AAA server 40 having the access point identifier. The message is preferably an access request but the message could also take the form of an accounting record. The message may be sent to the AAA server 40 using RADIUS, DIAMETER, or some other type of protocol.

The AAA server 40 receives the access request and uses the access point identifier to provide one or more location-based services to the mobile station 12. For instance, the AAA server 40 may determine whether to authorize the mobile station 12 to register with a wireless network agent. If the access point identifier identifies one of certain access points 30, then the AAA server 40 authorizes the mobile station 12 to register with the wireless network agent. On the other hand, if the access point identifier does not identify one of certain access points 30, then the AAA server 40 might not authorize the mobile station 12 to register with the wireless network agent.

Additionally or alternatively, the AAA server 40 may use the access point identifier to provide location-based billing. For instance, the access point identifier may define a certain billing rate for communication by the mobile station 12. When the mobile station 12 communicates with the foreign agent through certain access points 30, then the communication will be billed at one rate, while when the mobile station 12 communicates with the foreign agent through other access points 30, then the communication will be billed at another rate. The exemplary embodiment is not limited by how the AAA server 40 uses the access point identifier.

At step 210, the AAA server 40 sends to the foreign agent an access reply to the access request. The access reply indicates whether the mobile station is authorized to register with the foreign agent. At step 212, the foreign agent then sends the mobile IP registration request to the home agent. The home agent determines whether the mobile station 12 is authorized to register with the home agent. The home agent may extract the access point identifier from the mobile IP registration request and insert the access point identifier into an access request. Additionally, the home agent may store the access point identifier in memory to keep track of the access point which the mobile station 12 uses. At step 214, the home agent sends an access request to the AAA server 40. The access request may identify the access point identifier so that one or more location-based services are provided to the mobile station 12. At step 216, the AAA server 40 sends an access reply to the access request that indicates to the home agent whether the mobile station 12 is authorized to register with the home agent. Then, at step 218, the home agent sends a mobile IP registration reply to the foreign agent. The mobile IP registration reply may indicate whether AAA server 40 authorized the mobile station 12 to register with the home agent.

At step 218, the foreign agent sends a mobile registration reply to the mobile station 12. If both the access replies received at steps 210 and 216 indicate that the mobile station's registration is authorized, then the mobile registration reply indicates that the mobile station is authorized to register with the foreign agent. If one or both of the replies received at steps 210 and 218 indicates that the registration is not authorized, then the mobile station 12 is not authorized to register with the foreign agent.

In the event that the mobile station 12 is not authorized, one or both of the access replies received at steps 210, 218 may indicate an alternative access point via which the mobile station 12 can send a mobile registration message. The alternative access point may be different from the access point identified by the access point identifier sent by the mobile station. The foreign agent may insert an indication of the alternative access point into the mobile registration reply that is sent to the mobile station 12 at step 220, the mobile station 12 may receive the mobile registration reply, and then the mobile station 12 may then establish an air link with the alternative access point. For instance, the mobile station may send an access request to the alternative access point, and receive a traffic channel and IP address. The mobile station 12 may then send a registration request through the alternative access point to the foreign agent or some other wireless network agent.

Figure 7:
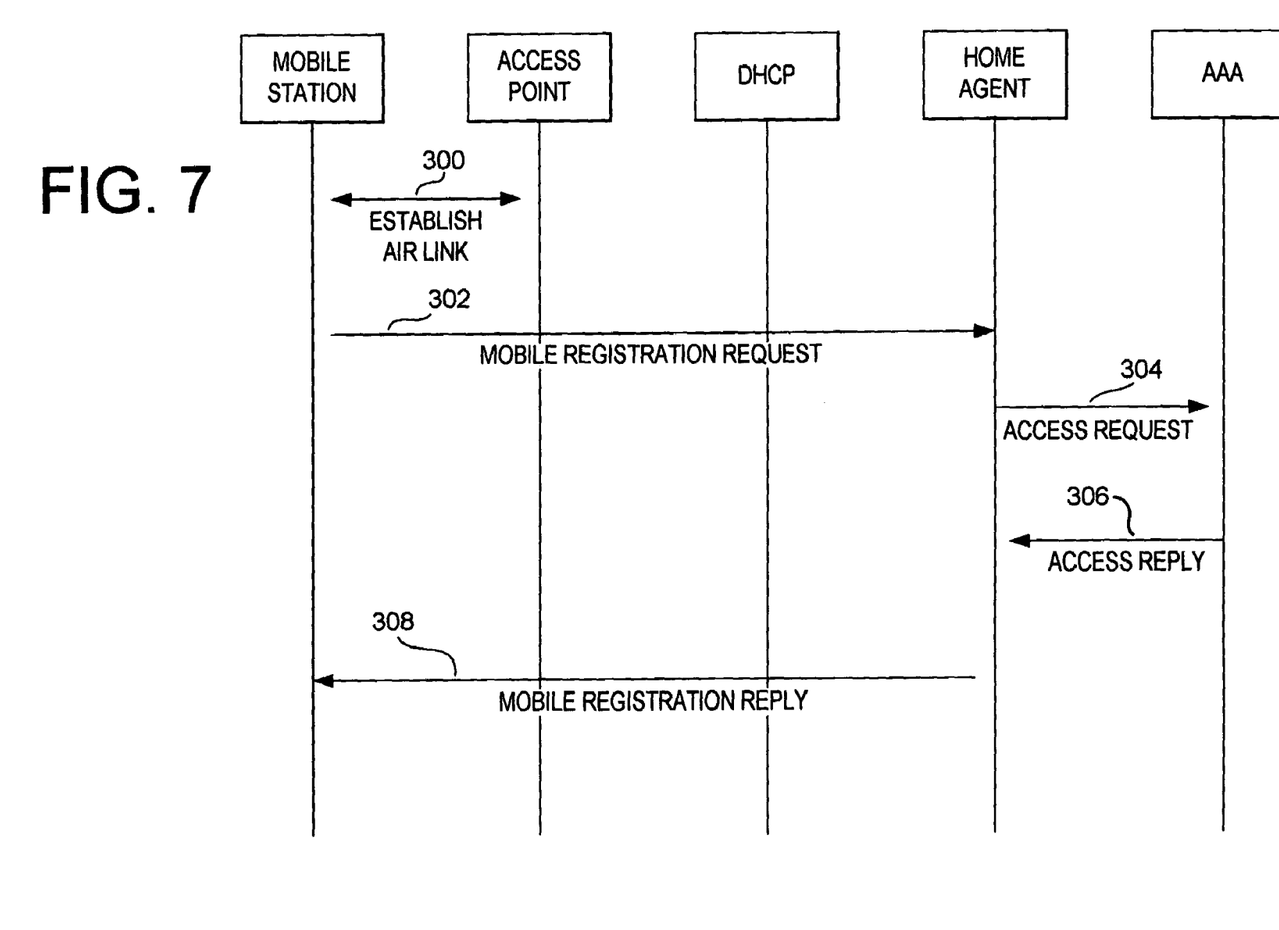
FIG. 7 is alternative call flow for mobile call setup in the wireless network of FIG. 1.

FIG. 6 illustrates an exemplary mobile IP call setup when the mobile station is in a visited network. In some instances, the mobile station might be in a home network or the wireless network might not have a foreign agent. In these instances, the mobile station will register directly with a home agent. FIG. 7 illustrates an exemplary mobile IP call set up in such an arrangement.

At step 300, the mobile station 12 establishes an air link with an access point 30 into the wireless network. The air link facilitates communication between the mobile station 12 and the access point 30 over the air interface 22. Then, at step 302, the mobile station 12 sends a mobile registration request to the home agent, via an access point 30. The mobile registration request has an access point identifier. The home agent receives the mobile registration request, extracts the access point identifier from the mobile IP registration request, and inserts the access point identifier into an access request. Additionally, the home agent may store the access point identifier in memory to keep track of the access point which the mobile station 12 uses. At step 304, the home agent may send a message to the AAA server 40. The message is preferably an access request but the message could also take the form of an accounting record. The message may be sent to the AAA server 40 using RADIUS, DIAMETER, or some other type of protocol. At step 306, the AAA server 40 sends an access reply to the access request, and in turn, at step 308, the home agent sends a mobile registration reply to the mobile registration request. The mobile registration reply could indicate whether the mobile station 12 is authorized to register with the home agent. Additionally, the mobile registration reply indicates an alternative access point into the wireless network. The mobile station 12 could establish an air link with this alternative access point and send a mobile registration request to the wireless network agent via this alternative access point.

In the exemplary embodiment described above, the mobile station 12 inserts an access point identifier into the mobile registration message. This access point identifier enables location-based services to be provided to the mobile station 12. In addition to inserting an access point identifier, the mobile station 12 may insert other types of information into the mobile registration message. For instance, if the mobile station 12 has a global positioning system (GPS) receiver arranged to determine the location of the mobile station 12, then the mobile station 12 might insert an indication of the location into the extension field 120 of the registration message. Additionally, the mobile station 12 might insert one or more of the following information into the extension field 120 of the mobile registration message:

IP address assigned by the DHCP server

Indication of the traffic channel

A relative strength of a signal received from the access point

A hardware address of the mobile station, such as an 802.11 MAC address

Parameters sent by the DCHP, including an IP address of the DHCP

The mobile station may set the type field 126 in the extension field 120 to correspond to a type of information inserted into the message. The types of information the mobile station might insert into the mobile registration message could take a variety of forms.

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:
at a mobile station, generating a mobile registration message for registering the mobile station for services in a wireless network, wherein an access point identifier is included in the mobile registration message, the access point identifier identifying an access point into the wireless network;
sending the mobile registration message from the mobile station to a wireless network agent, via the access point; and
registering the mobile station in the wireless network for services determined according to the access point identifier included in the mobile registration message.

2. The method of claim 1, wherein the access point broadcasts the access point identifier, the method further comprising at the mobile station, obtaining the access point identifier from the broadcast.

3. The method of claim 2, wherein obtaining the access point identifier comprises
receiving from the access point a broadcast that identifies a service set identifier (SSID), the SSID identifying the access point and
corresponding to the access point identifier.

4. The method of claim 3, wherein the access point is at least one access point and wherein the SSID is an extended SSID that identifies the at least one access point.

5. The method of claim 1, wherein the mobile station comprises memory for storing the access point identifier, the method further comprising retrieving the access point identifier from the memory.

6. The method of claim 1, wherein the mobile registration message is a mobile IP registration request.

7. The method of claim 1, wherein the access point identifier is indicative of a location for the access point, the method further comprising:
the wireless network agent sending the access point identifier to an authentication, authorization, accounting (AAA) server, the access point identifier being obtained by the wireless network agent from the mobile registration message; and
the AAA server providing a location-based service to the mobile station based on the access point identifier.

8. The method of claim 1, wherein the wireless network agent is selected from the group consisting of a home agent and a foreign agent.

9. The method of claim 1, wherein the mobile registration message is a request by the mobile station to register with the wireless network agent, and the step of registering the mobile station in the wireless network comprises:
the wireless network agent inserting the access point identifier included in the mobile registration message into an access request and sending the access request to a AAA server; and
the AAA server receiving the access request and making a determination whether to authorize the mobile station to register with the wireless network agent based on the access point identifier.

10. The method of claim 9, wherein the step of registering the mobile station in the wireless network further comprises:
when the AAA server does not authorize the mobile station to register with the wireless network agent, the AAA server sending to the wireless network agent an access reply that identifies an alternative access point;
the wireless network agent sending to the mobile station a registration reply that identifies the alternative access point; and
the mobile station establishing communication with the alternative access point.

11. The method of claim 10, wherein the step of registering the mobile station in the wireless network further comprises the mobile station sending the mobile registration message to the wireless network agent via the alternative access point.

12. The method of claim 10, wherein the step of registering the mobile station in the wireless network further comprises the mobile station sending the mobile registration message to an alternative wireless network agent via the alternative access point.

13. The method of claim 1, wherein the mobile registration message is a request by the mobile station to register with the wireless network agent, and the step of registering the mobile station in the wireless network comprises:
based on the access point identifier, refusing the request by the mobile station to register with the wireless network agent;
sending to the mobile station a registration reply that identifies an alternative access point identifier for an alternative access point into the wireless network; and
the mobile station establishing communication with the alternative access point.

14. The method of claim 13, wherein the step of registering the mobile station in the wireless network further comprises sending the mobile registration message to an alternative wireless network agent, via the alternative access point.

15. The method of claim 13, wherein the step of registering the mobile station in the wireless network further comprises sending the mobile registration message to the wireless network agent, via the alternative access point.

16. The method of claim 1, wherein the step of registering the mobile station in the wireless network comprises inserting an alternative access point identifier in a reply to the mobile registration message.

17. The method of claim 16, wherein the step of registering the mobile station in the wireless network further comprises sending the mobile registration message to the wireless network agent via an alternative access point identified by the alternative access point identifier.

18. The method of claim 16, wherein the step of registering the mobile station in the wireless network further comprises sending the mobile registration message to an alternative wireless network agent via an alternative access point identified by the alternative access point identifier.

19. The method of claim 1, wherein the mobile registration message is a request by the mobile station to register with the wireless network agent, and the step of registering the mobile station in the wireless network comprises:
the wireless network agent inserting the access point identifier included in the mobile registration message into an access request and sending the access request to a AAA server; and
the AAA server receiving the access request and, based on the access point identifier, establishing a billing rate for the mobile station.

20. A method comprising:
receiving from a mobile station, a mobile registration message for registering the mobile station for services in a wireless network, an access point identifier being included in the mobile registration message;
extracting from the mobile registration message, the access point identifier, the access point identifier identifying a location of an access point into the wireless network; and registering the mobile station in the wireless network for services determined according to the access point identifier included in the mobile registration message.

21. The method of claim 20, wherein the step of registering the mobile station in the wireless network comprises sending the access point identifier extracted from the mobile registration message to a AAA server.

22. The method of claim 21, wherein sending the access point identifier to the AAA server comprises sending to the AAA server a message that defines the access point identifier, the message selected from the group consisting of an access request and an accounting record.

23. The method of claim 20, further comprising storing the access point identifier in memory.

24. A method comprising:
at a mobile station, inserting into a mobile registration message for registering the mobile station for services in a wireless network, an access point identifier and information selected from the group consisting of a hardware address of a network device, an indication of a traffic channel, an indication of a strength of a signal received, and an indication of a location of the mobile station;
sending the mobile registration message from the mobile station to a wireless network agent via the access point into the wireless network; and
registering the mobile station in the wireless network for services determined according to at least the access point identifier in the mobile registration message.

25. A mobile station comprising computer instructions stored in memory and executable by a processor to perform the functions of:
inserting an access point identifier into a mobile registration message, the mobile registration message being used to register the mobile station for services in a wireless network, and the access point identifier identifying an access point into the wireless network;
sending the mobile registration message to a wireless network agent, via the access point; and
receiving a registration response indicative of the mobile station being registered in the wireless network for services determined according to the access point identifier in the mobile registration message.

26. The mobile station of claim 25, wherein the access point broadcasts the access point identifier, the mobile station further comprising computer instructions executable by the processor for obtaining the access point identifier from the broadcast before inserting the access point identifier into the mobile registration message.

27. The mobile station of claim 25, wherein the mobile station further comprises computer instructions stored in the memory for retrieving the access point identifier from the memory before inserting the access point identifier into the mobile registration message.

28. The mobile station of claim 25, wherein the computer instructions executable by the processor for performing the functions of receiving the registration response comprise computer instructions executable by the processor for performing the functions of:
receiving from the wireless network agent a registration reply that identifies an alternative access point into the wireless network; and
sending the mobile registration message to an alternative wireless network agent, via the alternative access point.

29. The mobile station of claim 25, wherein the computer instructions executable by the processor for performing the functions of receiving the registration response comprise computer instructions executable by the processor for performing the functions of:
receiving from the wireless network agent a registration reply that identifies an alternative access point into the wireless network; and
sending the mobile registration message to the wireless network agent, via the alternative access point.

30. The mobile station of claim 25, wherein the access point identifier is an SSID comprising a character string indicative of a location of the access point.

31. The mobile station of claim 30, wherein the access point is at least one access point and wherein the SSID is an extended SSID that identifies the at least one access point.

32. The mobile station of claim 25, wherein the mobile registration message is a mobile IP registration request.

33. The mobile station of claim 32, wherein the mobile IP registration request conforms to a mobile IP standard.

34. The mobile station of claim 25, wherein the computer instructions for performing the function of inserting the access point identifier into the mobile registration message comprise computer instructions for inserting the access point identifier into a field selected from the group consisting of normal vendor specific extension field and a critical vendor specific extension field.

35. The mobile station claim 25, wherein the access point identifier is an SSID; and wherein the normal vendor specific extension field and the critical vendor specific field comprise a vendor code and a type for the SSID.

36. The mobile station of claim 25, wherein the access point identifier is an SSID; and wherein a length field of the normal vendor specific extension field or the critical vendor specific field is a length of the SSID.

37. The mobile station of claim 25, wherein a broadcast by the access point identifies the access point identifier.

38. A wireless network comprising:
a mobile station;
a wireless network agent;
the mobile station comprising computer instructions stored in memory and executable by a processor for performing the functions of:
inserting an access point identifier into a mobile registration message, the mobile registration message being used to register the mobile station for services in a wireless network, and the access point identifier identifying an access point into the wireless network; and
sending the mobile registration message to a wireless network agent, via the access point;
the wireless network agent comprising computer instructions stored in memory and executable by a processor for performing the functions of:
receiving the mobile registration message;
extracting from the mobile registration message the access point identifier;
sending to a AAA server the access point identifier; and
registering the mobile station in the wireless network for services determined according to the access point identifier in the mobile registration message.

39. The system of claim 38, wherein the wireless network agent is selected from the group consisting of a home agent and a foreign agent.

40. The system of claim 38, wherein the AAA server refuses to authorize the mobile station to register with the wireless network agent; and wherein the AAA comprises computer instructions stored in memory and executable by a processor for performing the function of sending to the wireless network agent an alternative access point identifier.

41. The system of claim 38, wherein the AAA server comprises computer instructions stored in memory and executable by a processor for performing the function of receiving the access point identifier from the wireless network agent and, based on the access point identifier, establishing a billing rate for the mobile station.

42. The system of claim 38, wherein the AAA server comprises computer instructions stored in memory and executable by a processor for performing the function of providing a location-based service to a mobile station based on the access point identifier.

43. The system of claim 38, wherein the AAA server comprises computer instructions stored in memory and executable by a processor for performing the functions of receiving the access point identifier and making a determination whether to authorize the mobile station to register with the wireless network agent based on the access point identifier.

44. The system of claim 38, wherein the access point is at least one access point.

45. A server comprising computer instructions stored in memory and executable by a processor for performing the functions:
   receiving from a mobile station, a mobile registration message comprising an access point identifier, the mobile registration message being used to register the mobile station for services in a wireless network;
   extracting from the mobile registration message, the access point identifier, the access point identifier identifying a location of an access point into the wireless network; and
   registering the mobile station in the wireless network for services determined according to the access point identifier in the mobile registration message.

46. The server of claim 45, further comprising computer instructions for sending the access point identifier to a AAA server.

47. The server of claim 46, wherein the computer instructions for sending the access point identifier to the AAA server comprises computer instructions for sending to the AAA server a message that defines the access point identifier, the message selected from the group consisting of an access request and an accounting record.

48. The server of claim 45, further comprising storing the access point identifier in memory.

49. The server of claim 45, wherein the server is a packet data serving node.

50. A system comprising computer instructions stored in memory and executable by a processor for performing the functions of:
   at a mobile station, inserting into a mobile registration message for registering the mobile station for services in a wireless network, an access point identifier and information selected from the group consisting of a hardware address of a network device, an indication of a traffic channel, an indication of a strength of a signal received, and an indication of a location of the mobile station;
   sending the mobile registration message from the mobile station to a wireless network agent via the access point into the wireless network; and
   registering the mobile station in the wireless network for services determined according to at least the access point identifier in the mobile registration message.

* * * * *